United States Patent [19]

Nakamura

[11] Patent Number: 5,751,093
[45] Date of Patent: May 12, 1998

[54] VIBRATING GYROSCOPE

[75] Inventor: Takeshi Nakamura, Nagaokakyo, Japan

[73] Assignee: Murat Manufacturing Co., Ltd., Japan

[21] Appl. No.: 615,835

[22] Filed: Mar. 14, 1996

[30] Foreign Application Priority Data

Mar. 14, 1995 [JP] Japan .................................. 7-083293

[51] Int. Cl.$^6$ ..................................................... H01L 41/08
[52] U.S. Cl. ............................................ 310/369; 310/316
[58] Field of Search ................................. 310/316, 318, 310/319, 321, 353, 367, 369

[56] References Cited

U.S. PATENT DOCUMENTS

| | | | |
|---|---|---|---|
| 3,520,195 | 7/1970 | Tehon | 310/316 |
| 4,431,935 | 2/1984 | Rider | 310/331 |
| 4,611,490 | 9/1986 | Takeuchi | 73/505 |
| 4,799,385 | 1/1989 | Hulsing et al. | 73/505 |
| 5,012,174 | 4/1991 | Adkins et al. | 318/649 |
| 5,049,776 | 9/1991 | Ogawa | 310/333 |
| 5,117,148 | 5/1992 | Nakamura et al. | 310/367 |
| 5,256,929 | 10/1993 | Terajima | 310/326 |
| 5,270,607 | 12/1993 | Terajima | 310/316 |
| 5,336,960 | 8/1994 | Shimizu et al. | 310/369 |
| 5,345,822 | 9/1994 | Nakamura et al. | 310/316 |
| 5,349,857 | 9/1994 | Kasanami et al. | 310/316 |
| 5,355,034 | 10/1994 | Nakamura et al. | 307/491 |
| 5,400,269 | 3/1995 | White et al. | 364/570 |
| 5,412,204 | 5/1995 | Nakamura et al. | 310/316 |
| 5,415,039 | 5/1995 | Nakamura et al. | 310/321 |
| 5,430,342 | 7/1995 | Watson | 310/316 |
| 5,434,467 | 7/1995 | Abe et al. | 310/366 |

FOREIGN PATENT DOCUMENTS

| | | | |
|---|---|---|---|
| 0427177 | 5/1991 | European Pat. Off. | B06B 1/06 |
| 0520467A2 | 6/1992 | European Pat. Off. | G01C 19/56 |
| 0520467A3 | 6/1992 | European Pat. Off. | G01C 19/56 |
| 0520468A2 | 6/1992 | European Pat. Off. | G01C 19/56 |
| 0579974 | 6/1993 | European Pat. Off. | G01C 19/56 |
| 0597338 | 10/1993 | European Pat. Off. | G01C 19/56 |
| 64-16911 | 1/1989 | Japan | G01C 19/56 |
| 618266 | 1/1994 | Japan | G01C 19/56 |
| 650761 | 2/1994 | Japan | G01C 19/56 |
| 6147899 | 5/1994 | Japan | G01C 19/56 |

OTHER PUBLICATIONS

"Patent Abstracts of Japan" vol. 018, No. 624 (p. 1833), Nov. 28, 1994 & JP-A-06 241812 (Mitsubishi Electric Corp.), Sep. 2, 1994.

*Primary Examiner*—Thomas M. Dougherty
*Attorney, Agent, or Firm*—Ostrolenk, Faber, Gerb & Soffen, LLP

[57] ABSTRACT

A vibrating gyroscope 10 comprises a tubular member 12 made of a piezoelectric material. The tubular member 12 is polarized in its thickness direction. A common electrode 14 is formed on the inner surface of the tubular member 12, and outer electrodes 16a, 16b, 16c are formed on the outer surface of the tubular member 12. The outer electrodes 16a, 16b, 16c are spaced in the circumferential direction of the tubular member 12. A vibrating member 18 passes through the inside of the tubular member 12.

16 Claims, 4 Drawing Sheets

VIBRATING GYROSCOPE

BACKGROUND OF THE INVENTION

1. Field of the Invention

This invention relates to a vibrating gyroscope and, particularly, to a vibrating gyroscope for detecting angular velocity utilizing vibration of a vibrating member.

2. Description of the Related Art

FIG. 6 is a perspective view showing an example of a conventional vibrating gyroscope. This vibrating gyroscope 1 comprises, for example, a square, prism shaped vibrating member 2. Driving piezoelectric devices 3 for causing the vibrating member 2 to vibrate under a bending mode are adhered to each of two opposing faces of the vibrating member 2. Detecting piezoelectric devices 4 for obtaining a signal corresponding to an angular velocity are adhered to each of the other two opposing faces of the vibrating member 2.

In this vibrating gyroscope 1, a driving signal is applied to the driving piezoelectric devices 3 and the vibrating member 2 vibrates under a bending mode in a direction orthogonal to the planes of the driving piezoelectric devices 3. At this time, because the vibrating direction of the vibrating member 2 is parallel to the planes of the detecting piezoelectric devices 4, no signal is outputted from the detecting piezoelectric devices 4. When the vibrating member 2 is rotated about its axis under this vibrating state, the Coriolis force causes the vibrating direction of the vibrating member 2 to change. As a result, the detecting piezoelectric devices 4 bend and a signal is outputted from the detecting piezoelectric devices 4. Because the Coriolis force is generated in a direction orthogonal to the direction in which the vibrating member 2 vibrates when it is not rotating, the Coriolis force acts in a direction orthogonal to the planes of the detecting piezoelectric devices 4. As a result, the detecting piezoelectric devices 4 bend in proportion to the magnitude of the Coriolis force. This, in turn, results in an output signal corresponding to the Coriolis force being obtained from the detecting piezoelectric devices 4. Accordingly, by measuring the output signal of the detecting piezoelectric devices 4, it is possible to detect the angular velocity of the vibrating gyroscope 1.

There is a demand for this kind of vibrating gyroscope to be made smaller, but when the vibrating member 2 is made smaller, the piezoelectric devices adhered to the side faces thereof must also be made smaller. This, in turn, presents difficulties in adhering of the piezoelectric devices to the vibrating member, resulting in poor manufacturability of the vibrating gyroscope. Also, when the vibrating member is downsized, it becomes impossible to secure a sufficient width of the electrodes formed on the side surfaces of the vibrating member, resulting in degradation of the sensitivity of the vibrating gyroscope. Furthermore, as the vibrating gyroscope is made smaller, the vibrating member becomes slender resulting in its mechanical strength decreasing. Additionally, in order to obtain a highly sensitive vibrating gyroscope, it is necessary to make the amplitude of the vibration of the vibrating member large, and to do this, it is necessary to make the vibrating member slender. However, with a slender vibrating member the vibrating gyroscope is easily damaged.

The present invention solves the aforementioned drawbacks associated with the conventional art and provides a vibrating gyroscope which is miniaturized, highly sensitive, mechanically durable, and easy to manufacture.

SUMMARY OF THE INVENTION

According to the present invention, a vibrating gyroscope is provided. The vibrating gyroscope includes a tubular member made of a piezoelectric material, a vibrating member passing through the tubular member, a common electrode formed between and in contact with the inner surface of the tubular member and the vibrating member and a plurality of outer electrodes formed on the outer surface of the tubular member in the circumferential direction.

In accordance with a preferred embodiment of the vibrating gyroscope, the tubular member is polarized in its thickness direction.

The vibrating gyroscope of the present invention may preferably be formed by inserting a vibrating member into a tubular member, therefore, connection of the vibrating member to a common electrode is possible with one adhering operation. Also, even if the vibrating member is made slender, it is possible to secure a large area of the outer surface of the tubular member and, therefore, it is possible to make the areas of the outer electrodes large. If the tubular member is polarized in its thickness direction, by applying a driving signal to the outer electrodes it is possible to cause the vibrating member to vibrate under a bending mode. If the vibrating member is made of metal or the like, the vibrating member can be slender while still having a high mechanical strength. More specifically, if the vibrating member is made of a material having a high mechanical strength, such as metal, even if a large vibration amplitude is applied to the vibrating member, it will not readily break. Thus, a large vibration amplitude can be obtained and the sensitivity of the vibrating gyroscope can be increased. Furthermore, it is possible to make the areas of the outer electrodes large even if the vibrating member is made slender, and the vibration amplitude of the vibrating member can be made large for this reason also. Also, because the vibrating member and the tubular member can be integrated with one adhering operation, compared to a conventional vibrating gyroscope wherein a plurality of piezoelectric devices are adhered to side faces of an vibrating member, the manufacturability of the vibrating gyroscope can be improved.

The above-mentioned objects and other objects and merits of the invention will become clearer from the following detailed description of preferred embodiments thereof which refers to the accompanying drawings.

DETAILED DESCRIPTION OF THE PREFERRED EMBODIMENTS

Figure 1:
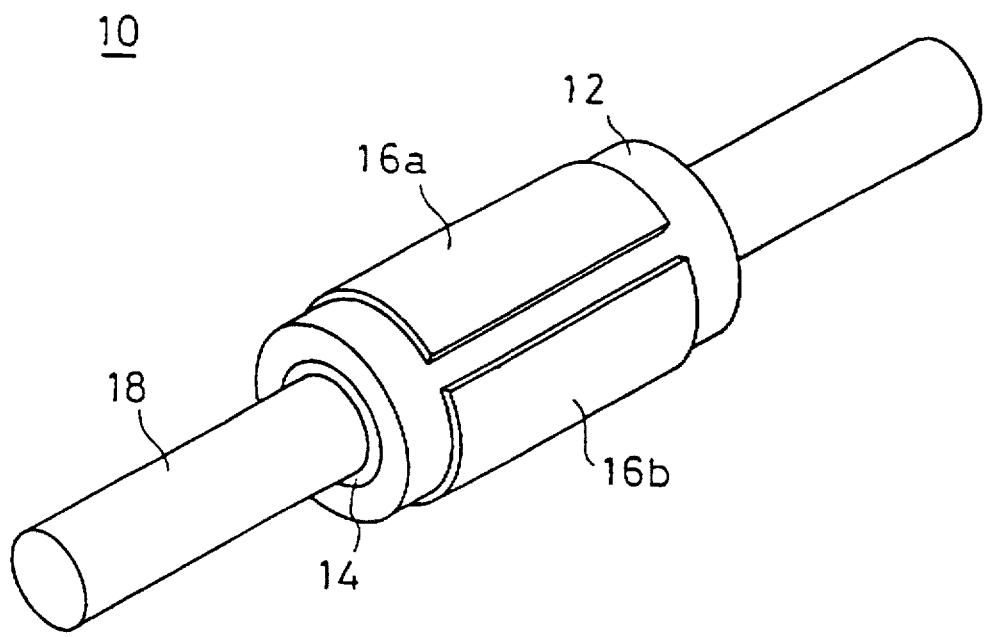
FIG. 1 is a perspective view of a vibrating gyroscope of a first embodiment of the invention.
Figure 2:
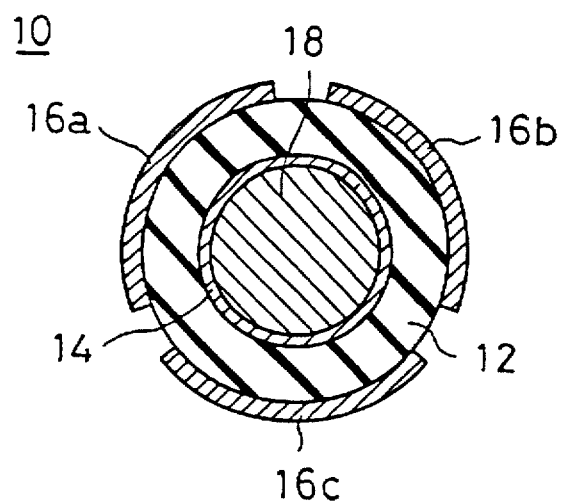
FIG. 2 is a sectional view of the vibrating gyroscope shown in FIG. 1.

FIG. 1 is a perspective view of a vibrating gyroscope 10 illustrating certain features of the invention, and FIG. 2 is a sectional view thereof. The vibrating gyroscope 10 comprises a cylindrical tubular member 12 which, for example, may be made of a piezoelectric material, such as a piezoelectric ceramic. A common electrode 14 is formed on the inner surface of the tubular member 12. Three outer electrodes 16a, 16b, 16c are formed on the outer surface of the tubular member 12. The outer electrodes 16a, 16b, 16c are spaced uniformly in the circumferential direction of the tubular member 12. The tubular member 12 is polarized in the direction of its thickness. That is, the tubular member 12 is polarized from its inner side toward its outer side or from its outer side toward its inner side.

A cylindrically shaped (or columnar shaped) vibrating member 18 passes through the tubular member 12 such that the whole circumference of the portion of the vibrating member 18 within the tubular member 12 is covered by the tubular member 12 via the common electrode 14. The vibrating member 18 is, for example, made of a permanently elastic material, such as elinvar, iron-nickel alloy, quartz, glass, crystal or ceramic. The vibrating member 18 and the common electrode 14 are adhered together using a conducting paste or adhesive or the like. As a result, the tubular member 12 and the vibrating member 18 are integrated to form the vibrating gyroscope 10.

Figure 3:
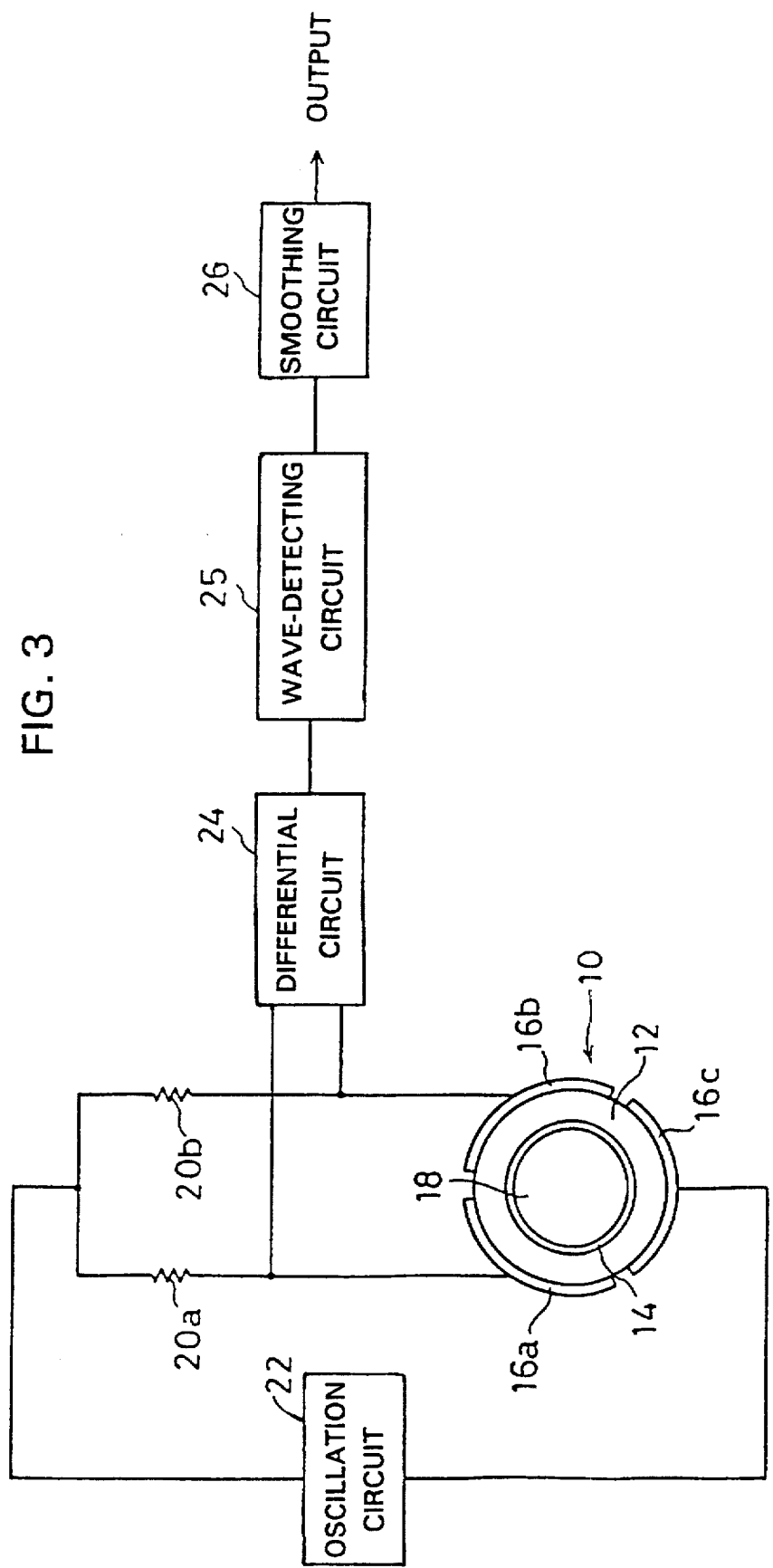
FIG. 3 is a schematic view of a circuit for using the vibrating gyroscope shown in FIG. 1.

In use of the vibrating gyroscope 10, as shown in FIG. 3, an oscillation circuit 22 is electrically connected with the outer electrodes 16a and 16b via resistors 20a and 20b. The oscillation circuit 22 is also connected with the outer electrode 16c. An output signal of the oscillation circuit 22 is applied to the outer electrodes 16a, 16b as a driving signal, and an output signal from the outer electrode 16c is fed back to the oscillation circuit 22. The outer electrodes 16a, 16b are also connected to a differential circuit 24 and the differential circuit 24 is connected to a wave-detecting circuit 25. The wave-detecting circuit 25 is connected to a smoothing circuit 26.

The driving signal from the oscillation circuit 22 causes the parts of the tubular member 12 where the outer electrodes 16a, 16b are formed to expand and contract. As a result, the vibrating member 18 vibrates under a bending mode in the direction of a line connecting a point midway between the outer electrodes 16a, 16b to the middle of the outer electrode 16c. The vibrating member 18 is supported by conventional means (not shown) near each of two node points of this bending vibration. As a result of the bending vibration of the vibrating member 18, an electric charge is generated in the outer electrode 16c and this is fed back to the oscillation circuit 22 as a feedback signal.

An output signal from the outer electrodes 16a, 16b is inputted into the differential circuit 24. When the vibrating gyroscope 10 is not rotating, the bending states of the outer electrode 16a, 16b are the same and charges generated in these parts of the tubular member 12 are the same. Consequently, the output signals of the outer electrodes 16a, 16b are the same and no signal is outputted from the differential circuit 24. When the vibrating gyroscope 10 rotates about the axis of the vibrating member 18, a Coriolis force is generated in a direction orthogonal to the direction in which the vibrating member 18 vibrates when the vibrating gyroscope 10 is not rotating. As a result, the direction of the bending vibration of the vibrating member 18 changes. Consequently, a difference arises between the bending states of the parts of the tubular member 12 where the outer electrodes 16a, 16b are formed, and a difference also arises in the charges generated in these parts of the tubular member 12. Therefore, different signals are outputted from the outer electrodes 16a, 16b and an output signal is obtained from the differential circuit 24.

Because the parts where the outer electrodes 16a, 16b are formed are symmetrical with respect to the direction in which the vibrating member 18 vibrates when not rotating, the outer electrodes 16a, 16b bend due to the Coriolis force in opposite directions. Therefore, signals of opposite polarity are outputted from the outer electrodes 16a, 16b in correspondence with the Coriolis force. As a result, if there is a difference between the output signals from the outer electrodes 16a, 16b, it is possible to obtain a large output signal corresponding to the Coriolis force from the differential circuit 24. This output signal from the differential circuit 24 is wave-detected by the wave-detecting circuit 25 and then smoothed by the smoothing circuit 26, and then, if necessary, amplified by conventional amplifying means (not shown). A direct current signal corresponding to the Coriolis force is obtained from the smoothing circuit 26, and by measuring this signal it is possible to detect the angular velocity of the vibrating gyroscope 10.

Figure 6:
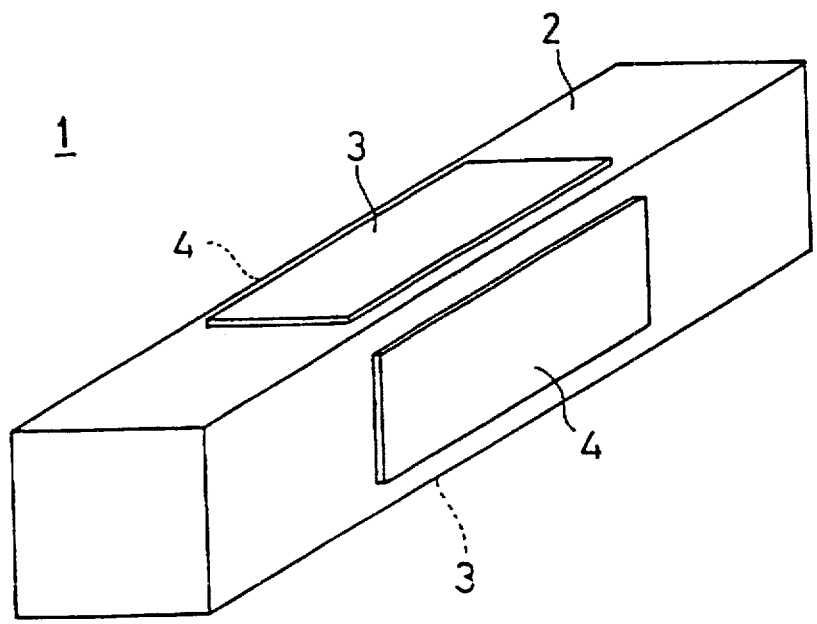
FIG. 6 is a perspective view of a conventional vibrating gyroscope.

Because the vibrating member 18 of the vibrating gyroscope 10 passes through the tubular member 12, even if the vibrating member 18 is made slender, the areas of the outer electrodes 16a, 16b, 16c can be made large. As a result, by applying a driving signal it is possible to obtain a bending vibration of large amplitude and a large output signal corresponding to the Coriolis force. Therefore, it is possible to obtain a highly sensitive vibrating gyroscope. Furthermore, if the vibrating member 18 is made of a material, such as metal, a high mechanical strength can be obtained, and even if the amplitude of the bending vibration is made large the vibrating member 18 does not readily break. In this way, the vibrating member 18 can be made slender and the vibrating gyroscope 10 can be made small, resulting in the ability to detect angular velocities with high sensitivity. Furthermore, the tubular member 12 and the vibrating member 18 can be integrated with one adhering operation, as compared to a conventional vibrating gyroscope, such as the vibrating gyroscope of FIG. 6, wherein a plurality of piezoelectric devices are adhered to a vibrating member. As a result, the manufacturability of the vibrating gyroscope 10 is significantly improved.

Figure 4:
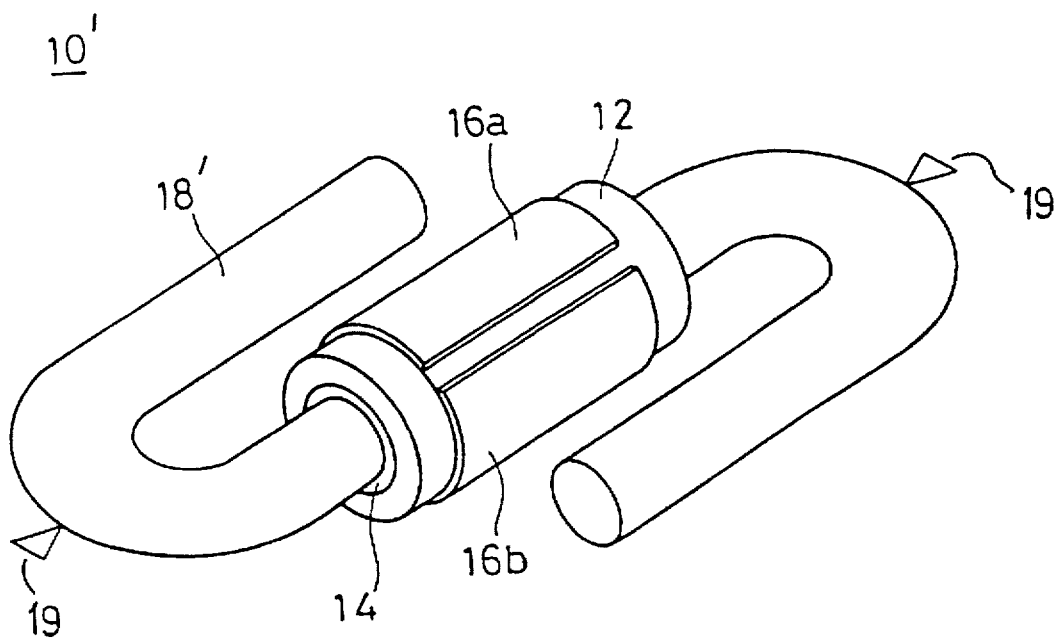
FIG. 4 is a perspective view of another embodiment of the invention.
Figure 5:
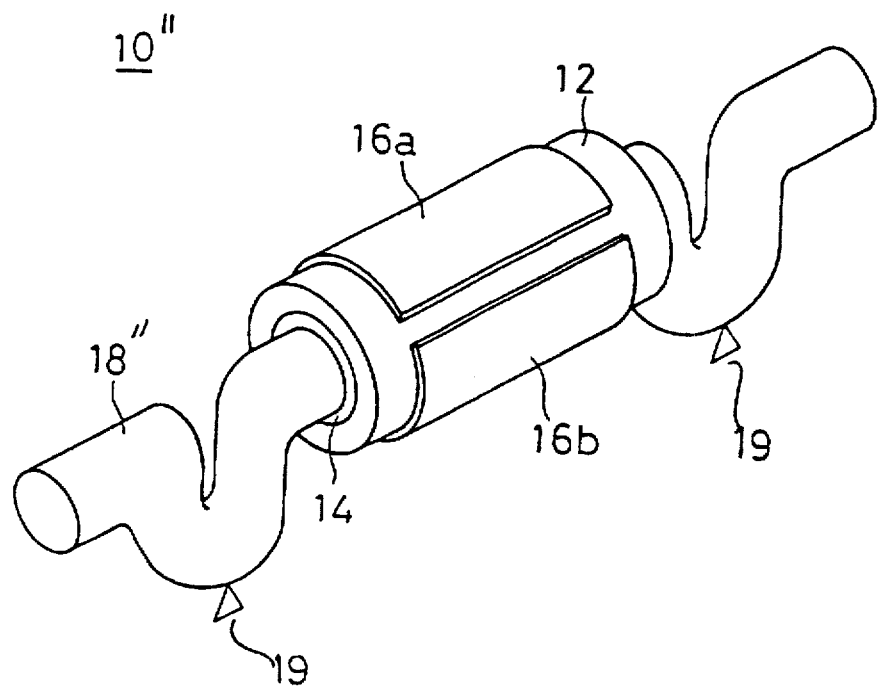
FIG. 5 is a perspective view of still another preferred embodiment of the invention.

Turning now to FIGS. 4 and 5, wherein the triangles 19 denote supports at node points, there are shown alternative embodiments of vibrating gyroscopes in accordance with the invention in which the vibrating member is bent near the node points. Components in FIGS. 4 and 5 which are the same as those in FIGS. 1 and 2 have the same reference numerals, while those which are similar in function have either a primed reference numeral (FIG. 4) or a double primed reference numeral (FIG. 5).

Referring now to FIG. 4, there is shown a vibrating gyroscope 10' having a vibrating member 18' wherein one protruding portion of the vibrating member 18' is bent near a node point in a first direction, and the other protruding portion is bent near another node point in a second direction which is opposite to the first direction. Alternatively, as shown in FIG. 5, the vibrating gyroscope 10" includes a vibrating member 18" which has U-shaped portions at the node points such that the U-shaped portions are formed in the same plane and in the same direction.

Although, the shape of the vibrating members 18, 18' and 18" is shown as cylindrical, other prismatic shapes such as a triangular prism shape or a square prism shape may be used. In this case, the tubular member 12 is also made triangular or square. Also, the vibrating member 18 (or 18' or 18") may be split in the middle and inserted into the tubular member 12 from both ends thereof and then fixed at the middle. Also, the tubular member 12 may be shaped out of a piezoelectric ceramic and then baked after the vibrating member 18 (or 18' or 18") is inserted through it so that making of the tubular member 12 and fixing of the vibrating member 18 (or 18' or 18") may thereby be carried out simultaneously. Also, as the mode of vibration of the vibrating member 18 (or 18" or 18"), besides bending vibration, other vibration modes such as longitudinal vibration can be used. In this case, the number and shapes of the outer electrodes formed on the tubular member 12 are adjusted to suit the vibration mode.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibrating gyroscope comprising:
   a tubular member made of a piezoelectric material;
   a vibrating member passing through the tubular member;
   a common electrode provided between and in contact with an inner surface of the tubular member and the vibrating member; and
   a plurality of outer electrodes provided in the circumferential direction on an outer surface of the tubular member.

2. A vibrating gyroscope according to claim 1 wherein the tubular member is polarized in its thickness direction.

3. A vibrating gyroscope according to claim 2, wherein the tubular member is polarized from its inner surface to its outer surface.

4. A vibrating gyroscope according to claim 2, wherein the tubular member is polarized from its outer surface to its inner surface.

5. A vibrating gyroscope according to claim 1, wherein the vibrating member is cylindrically shaped.

6. A vibrating gyroscope comprising:
   a tubular member having opposed ends and made of a piezoelectric material;
   a common electrode provided on an inner surface of the tubular member;
   a plurality of outer electrodes spaced in the circumferential direction on an outer surface of the tubular member; and
   a vibrating member passing through the tubular member, the vibrating member having opposed end portions extending respectively from the opposed ends of the tubular member.

7. A vibrating gyroscope according to claim 6 wherein the tubular member is polarized in its thickness direction.

8. A vibrating gyroscope according to claim 7, wherein the tubular member is polarized from its inner surface to its outer surface.

9. A vibrating gyroscope according to claim 7, wherein the tubular member is polarized from its outer surface to its inner surface.

10. A vibrating gyroscope according to claim 6, wherein the vibrating member is cylindrically shaped.

11. A vibrating gyroscope according to claim 6, wherein the outer electrodes are equally spaced in the circumferential direction.

12. A vibrating gyroscope according to claim 6, wherein there are three outer electrodes equally spaced in the circumferential direction.

13. A vibrating gyroscope according to claim 6, wherein the opposed end portions of the vibrating member have respective node points.

14. A vibrating gyroscope according to claim 13, wherein one of the opposed end portions of the vibrating member is bent adjacent to its respective node point in a first direction and the other of the opposed end portions of the vibrating member is bent adjacent to its respective node point in a second direction opposite to the first direction.

15. A vibrating gyroscope according to claim 13, wherein the opposed end portions of the vibrating member have respective U-shaped portions adjacent their respective node points, the U-shaped portions being located in the same plane and extending in the same direction.

16. A vibrating gyroscope circuit comprising:
   a) a vibrating gyroscope comprising:
      (i) a tubular member made of a piezoelectric material;
      (ii) first, second and third outer electrodes spaced in the circumferential direction on an outer surface of the tubular member;
      (iii) a vibrating member passing through the tubular member; and
      (iv) a common electrode provided between and in contact with an inner surface of the tubular member and the vibrating member;
   (b) an oscillation circuit;
   (c) first means for connecting the oscillation circuit to the first and second outer electrodes to apply a driving signal thereto;
   (d) second means for connecting the third outer electrode to the oscillation circuit as a feedback signal; and
   (e) third means connected to the oscillation circuit for sensing any voltage difference between the first and second outer electrodes.

* * * * *